April 16, 1963     A. E. ROSANDER     3,085,494
INFUSION TYPE COFFEE MAKER
Filed July 23, 1958     2 Sheets-Sheet 1
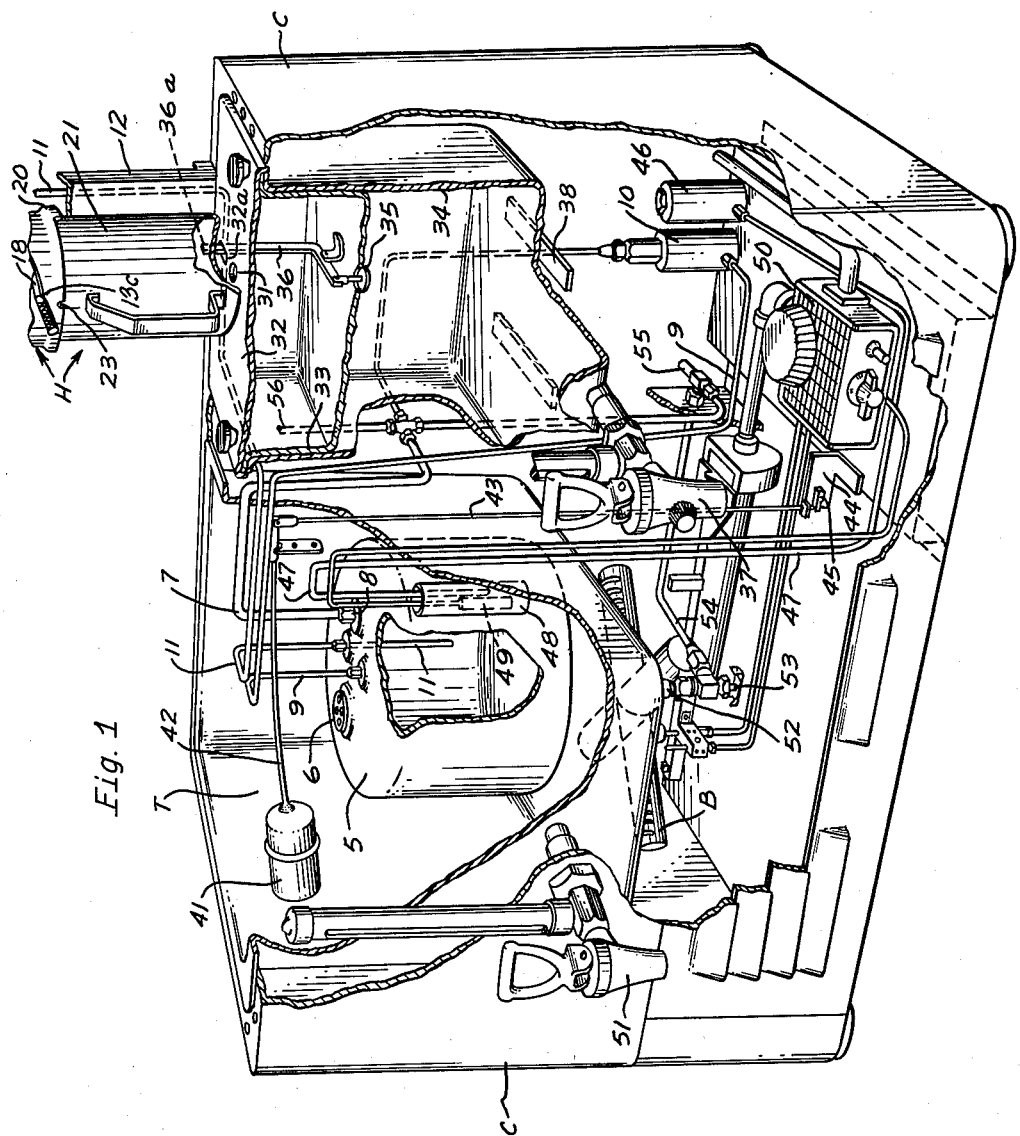
INVENTOR
ALEX EDWARD ROSANDER
BY
John W. Adams
ATTORNEY April 16, 1963  A. E. ROSANDER  3,085,494
INFUSION TYPE COFFEE MAKER
Filed July 23, 1958  2 Sheets-Sheet 2
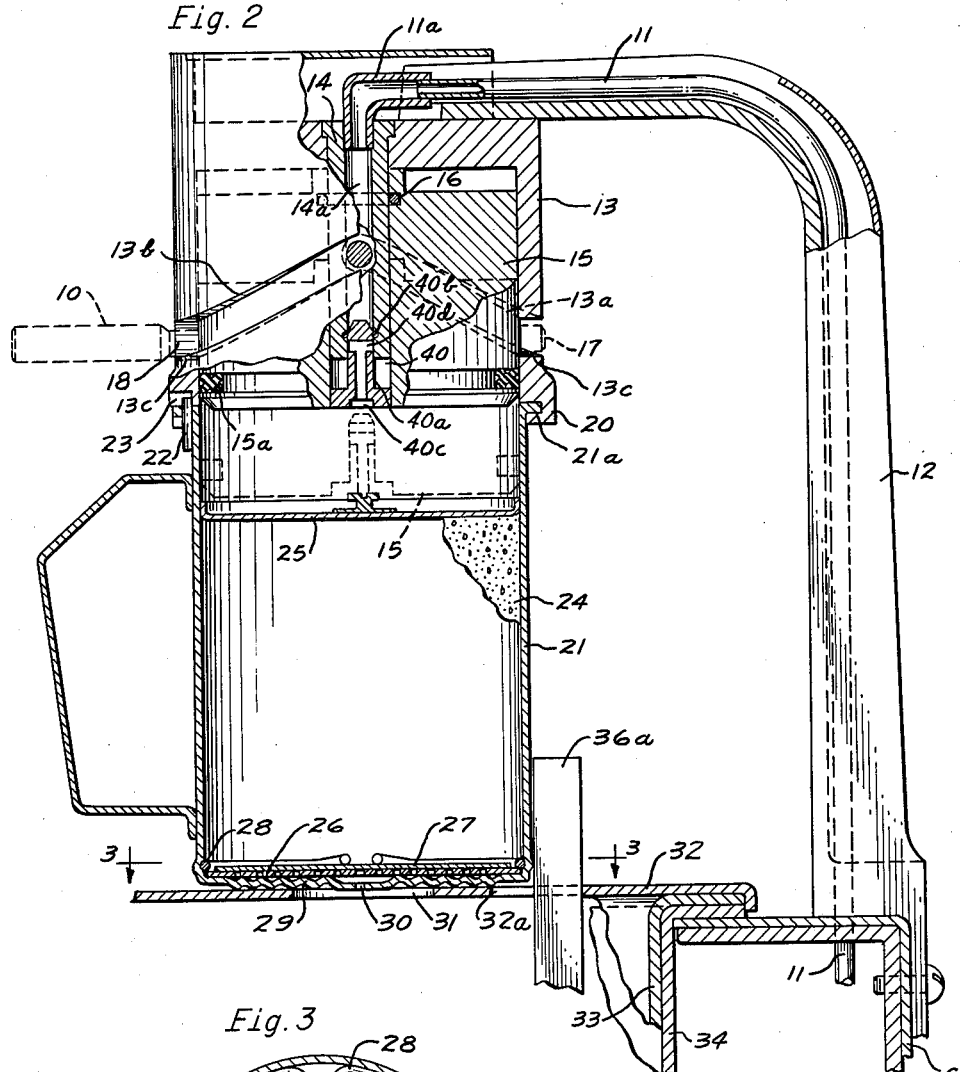
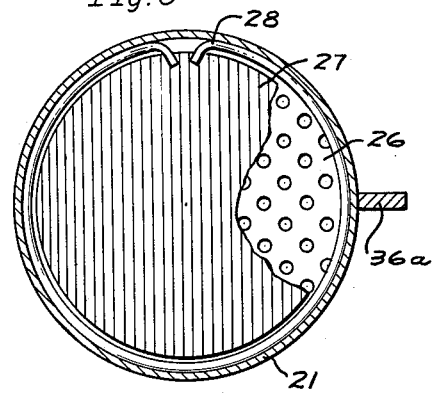
INVENTOR
ALEX EDWARD ROSANDER
BY John W. Adams
ATTORNEY United States Patent Office 3,085,494
Patented Apr. 16, 1963

3,085,494
INFUSION TYPE COFFEE MAKER
Axel Edward Rosander, 5008 Edinbrook Lane, Edina, Minneapolis 10, Minn.
Filed July 23, 1958, Ser. No. 750,400
9 Claims. (Cl. 99—283)

This invention relates to an improved infusion type coffee maker, and particularly to the infusion head assembly for such a coffee maker.

The structure herein disclosed is closely related to my co-pending application, Serial No. 452,321, filed August 26, 1954, which resulted in U.S. Patent No. 2,887,038 issued May 19, 1959, and while the structure disclosed in said co-pending application has worked satisfactorily, certain improvements embodied in the instant invention provide improved results in both the manufacturing and operation of said machine.

It is an object of my present invention to provide a coffee maker of the pressure infusion type wherein a predetermined quantity of hot water under a predetermined pressure flows through confined coffee grounds into a storage container from which coffee of uniform strength can be withdrawn even during a coffee brewing cycle.

It is another object to provide an infusion type coffee maker having a ground coffee confining basket manually removable for refilling the same and including a shiftable sealing mechanism in connection with the basket designed to prevent the hot water supply from being discharged through the head and basket until the basket is in infusion position and the upper portion thereof is sealed by the sealing mechanism.

It is another object to provide a coffee maker producing a continuous flow of liquid coffee during the coffee-making cycle and providing a container for receiving said flow and for subsequent delivering of the complete batch of coffee to a separate storage container only after completion of the entire coffee brewing cycle.

It is another object to provide an infusion type coffee maker wherein a ground coffee confining basket has a restricted discharge opening formed in the bottom thereof, which is designed to afford greater restriction to flow of liquid therethrough than does the ground coffee confined within the basket, thus equalizing the pressure below the coffee with that above the coffee and preventing the pressure of the hot water supply from unduly compacting the ground coffee within the basket.

These and other objects and advantages of my invention will more fully appear from the following description made in connection with the accompanying drawings, wherein like reference characters refer to the same or similar parts throughout the several views, and in which—

FIG. 1 is a perspective view with parts broken away, showing my improved coffee maker;

FIG. 2 is a vertical sectional view of the coffee infusion head and mounting bracket therefor; and FIG. 3 is a horizontal sectional view taken substantially along the line 3—3 of FIG. 2.

As illustrated in FIG. 1, I provide a casing designated by the letter C within which is constructed a hot water supply tank T having a thermostatically controlled heat source such as the gas burner B disposed therebelow. A pre-measuring tank designated by the numeral 5 is mounted within the hot water supply tank T and disposed completely below the normal liquid level therein to be submerged within the hot water of said tank. In the form shown, a check valve 6 affords communication between the water in tank T and the pre-measuring tank 5 but is closed in response to application of a predetermined pressure from within the pre-measuring tank 5.

This valve corresponds in operation to the check valve 16 described in my previously identified co-pending application. A vent pipe 7 extends upwardly from the top of the pre-measuring tank 5 to a point above the liquid level of the tank T and is provided with a check valve 8 corresponding to the check valve 17 of my co-pending application and closing upon application of a predetermined fluid pressure from within the pre-measuring tank 5. Air is supplied to the pre-measuring tank 5 through a conduit 9 and an air valve 10. The hot water is forced out of the pre-measuring tank through a supply tube 11 which is connected to the infusion head assembly designated as an entirety by the letter H.

The head assembly H includes a supporting bracket 12 which is mounted in fixed relation at the rear of the casing C and extends upwardly therefrom and has a mounting head element 13 fixed thereto, as best shown in FIG. 2. The upper portion of the head 13 has a fixed sleeve member 14 rigidly connected therewith and providing a delivery passage 14a therewithin which passage receives hot water under pressure from hot water supply tube 11 through a connection elbow 11a. A projectible locking and sealing element 15 is mounted for rotational and vertical rectilinear movement within a lower generally cylindrical portion of said mounting element 13 and, of course, is also slideably mounted on the outside of the sleeve 14 to permit said projectible element to move upwardly and downwardly with respect to the fixed mounting head element 13 and sleeve 14, as will be described hereafter. A suitable seal is provided between the outside of sleeve 14 and the projectible element 15 such as the O-ring 16. A pair of sloping cam slots are, in the form shown, provided through the side wall of the fixed mounting head element 13 and are respectively designated by the numerals 13a and 13b. A pair of follower pins 17 and 18 respectively work in said slots 13a and 13b. A handle 19 is connected to the cam pin 18 and said pins 17 and 18 are mounted in fixed relation to the projectible element 15, as shown in FIG. 2. The lower ends of the slots 13a and 13b have offset retaining portions into which the pins 17 and 18 are respectively received at the lower ends of their paths and these offset retaining portions are designated by the reference character 13c. The lower end of the mounting element 13 has a basket-receiving skirt of flange segment 20, the front portion of which is broken away to permit a ground coffee confining basket 21 to be removably inserted therewithin. The top edge of the coffee basket 21 has a peripheral flange 21a formed therearound which is received within a cooperating groove formed within the skirt segment 20. An alignment pin 22 may be provided in fixed relation on the basket and the same is received within an anchoring slot or recess 23 formed at the front of the lower end of the cylindrical portion of the head element 13. This prevents rotation of the basket when the projectible element 15 is projected downwardly into the upper portion of the basket, as shown by the dotted line position in FIG. 2. This downward projection of the element 15 is accomplished by manually rotating the same so that the cam pins 17 and 18 will move downwardly in the sloping cam slots 13a and 13b and cause said projectible element 15 to shift downwardly into the upper portion of the basket 21. The lower peripheral edge portion of the element 15 is provided with suitable sealing means such as the O-ring 15a located therein which forms a positive peripheral seal around the top of the basket and permits a predetermined water pressure to be maintained within the basket without leakage. A predetermined amount of ground coffee 24 is confined within the basket 21 and an upper retaining screen member 25 is placed thereon. A lower screen member 26 has a porous filter element 27 supported thereon and a spring-retaining ring 28 holds the screen disc 26 in place by resiliently expanding into a cooperating groove provided in the bottom of the basket. A plurality of projections are formed in the bottom of the basket 21 such as the annular ridges 29 and serve to hold the screen 26 in spaced relation above the extreme bottom of said basket. A relatively small single restrictive opening 30 is provided through the bottom of the basket, the bottom and side walls of which are otherwise imperforate. The opening 30 is of such a size as to provide greater restriction to the flow of liquid therethrough than do the coffee grounds themselves. This provides uniform pressure throughout the basket 21 above and below the filter 27 and screen 28. This prevents packing of the coffee grounds within the basket which would cause undue restriction to flow of liquid therethrough.

When the basket 21 is disposed in infusion position, the restricted coffee discharge opening 30 is disposed in registration above a delivery opening 31 formed in a cover panel 32. This permits the liquid coffee to flow down into a container having an upper compartment 33 and a lower storage compartment 34. The bottom of the upper compartment 33 has an opening therethrough in which a valve 35 is mounted and said valve is retained in closed position by engagement of the basket against bell crank 36 which is pivotally connected to said bottom of the compartment 33 and having an upwardly extending arm 36a which projects through an elongated slot formed in the cover 32 to permit engagement of the upwardly extending arm 36a by the rear portion of the basket 21, as best shown in FIG. 2. This holds the valve in closed position and the valve is weighted to open when the basket is removed from infusion position on the groove flange or skirt 20. A valve for drawing off liquid coffee is designated by the numeral 37 and permits the coffee stored in the lower compartment 34 to be drawn from said compartment. Suitable means for maintaining at the proper temperature the coffee in the storage compartment 34 are provided such as the electric heating bars 38 of conventional design and thermostatically energized by any conventional thermostat circuit (not shown).

*Operation*

A timer is provided which, unless manually started, normally maintains the control circuit to the solenoid air valve 10 open, but when the timer is manually started the solenoid winding of the air valve 10 will be energized to open the valve, permitting a source of air under pressure to be supplied through the tube 9 to the pre-measuring tank 5. This air pressure immediately closes filler valve 6 and vent valve 8 and forces water from the pre-measuring tank out through the water supply conduit 11 to the upper end of the water delivery passage 14a. As best shown in FIG. 2, a safety valve assembly 40 is held in closed flow-restricting position until the projectible head element 15 has been projected downwardly into sealed locking relationship within the top of the basket 21, as shown by the dotted line position in FIG. 2. The valve assembly includes an upwardly extending valve member 40a fixed within the lower portion of the projectible element 15 as by having an enlarged head pressed into a cooperating opening formed in the lower end of said element 15, and said valve member 40a moves with said element when the same is projected upwardly and downwardly. When said element 15 is in elevated position, as shown by the full lines of FIG. 2, the upper end portion of the valve member 40a will be sealed within a valve seat formed by an O-ring 40b and said valve member 40a is of a diameter to closely fit within the lower portion of the passage 14a disposed below the seat or O-ring 40b but is of substantially smaller diameter than the central bore of the projectible element 15 which slides on the fixed sleeve member 14. The lower portion of the valve member 40a has a central delivery passage 40c formed therein which communicates with the surrounding chamber through a cross bore 40d. Until the upper portion of the valve member 40 has been fully retracted from the bottom of the passage 14a, even after the same has been moved downwardly below the sealing ring 40b, flow will be restricted by said valve member 40a in view of the close fit between the same and the lower portion of the passage 14a and unrestricted flow will only be permitted when the upper end of the valve member 40a has been fully retracted from the lower end of the sleeve 14 and its passage 14a therethrough. This can only be accomplished when the projectible element 15 has been shifted into its extreme downwardly projected position, as shown by the dotted lines in FIG. 2.

The water is then supplied under pressure to the basket 21 which has been positioned below the stationary head member 13 and into which the projectible element 15 has been projected. This hot water under pressure requires a relatively short time to remove the coffee flavor from the ground coffee confined within the basket 21 (usually less than four minutes) and the liquid coffee thus brewed is delivered into the upper compartment 33 of the coffee receiving container and remains in said upper compartment until completion of the entire brewing cycle so that coffee of uniform strength may be continually drawn from the storage compartment during the brewing cycle and the strength of the coffee in the storage compartment 34 will not be varied at any time during the brewing cycle since each batch of coffee ultimately brewed will always be of the same strength if the same amount of similar coffee is used and water under the same pressure and at the same temperature is supplied thereto. The volume of water supplied through the conduit 11 is controlled by the position of the lower end of said conduit within the pre-measuring tank and the timer 39 is pre-set to discharge a small amount of air under pressure through said conduit 11 and through the ground coffee after the water has been forced out of the pre-measuring tank to the level of the lower end of the conduit 11 therein to remove substantially all of the water from the grounds in the basket 21.

A float 41 is provided in the hot water supply tank T and is connected by an arm 42 to an upstanding link 43 which pivots on its pivotal axis, a mercury switch 45 pivotally mounted on a mounting plate 44. This causes the mercury switch 45 of conventional design to open a solenoid-operated water supply valve 46 to supply water to the tank T through supply conduit 47. The upper end of the supply conduit 47 is doubled back upon itself so that the discharge end thereof is disposed below the surface of the water level in the tank T, and a confining cylinder or sleeve 48 is mounted around the lower discharge end of said supply tube 47 and also houses the sensing bulb 49 of a thermostatic gas supply switch of conventional design and designated by the numeral 50. Confining the cold water discharged from the supply conduit 47 instantly produces a temperature change in the sensing bulb 49 sufficient to start the gas burner B so that the water is constantly being heated while cold water is being supplied thereto and the burner B will, of course, remain in operation until the temperature of the water within the tank T reaches the predetermined limit set on the thermostatic control 50. A hot water supply faucet 51 is provided in the tank 5 for the convenience of the operator. A drain 52 having a manual valve 53 is connected to the bottom of the hot water tank T to permit the same to be drained for cleaning. A drain conduit 54 is connected with a main drain pipe 55 which is also connected to the vent tube 7. A standpipe overflow drain 56 in the upper compartment 33 is also connected to the drain pipe 55 as is the air discharge from the pre-measuring tank 5 when the solenoid winding of the valve 10 has been de-energized by the timer. Upon completion of the brewing cycle as governed by the timer, the valve 10 will again be shifted into closed position and is designed in said closed position to afford communication between the pre-measuring tank 5 and the drain conduit 55 through the air tube 9 and an air exhaust conduit 56.

It will be seen that I have provided a relatively simple yet highly efficient improved coffee maker which is designed to quickly produce coffee of uniform strength and which has an infusion head assembly which is relatively simple to operate and yet which incorporates safety features which insure safe operation thereof since hot water will not be supplied from the pre-measuring tank 5 until the timer is manually started and the projectible element 15 is manually shifted downwardly into its projected position within the upper portion of the basket 21. This simple and efficient operation provides improved results over my previously identified co-pending application.

It will, of course, be understood that various changes may be made in the form, details, arrangements and proportion of parts without departing from the scope of my invention, which generally started consists in the matter set forth in the appended claims.

What I claim is:

1. In a coffee maker of the pressure infusion type, a mounting head, a basket for confining coffee removably carried by the head, means cooperatively associated between said head and said basket for holding the basket in infusion position, sealing means around the upper portion of said basket when the same is in infusion position, means for supplying hot water under pressure to said basket when the same is in infusion position, said basket having a coffee-discharge opening in the lower portion thereof, foraminous means supporting the coffee grounds within said basket above said opening, a coffee-receiving container disposed below said opening to receive liquid coffee discharged through the opening, said container being divided into upper and lower compartments and having passage means affording communication between said compartments, a valve in said passage means, valve actuating mechanism cooperatively associated with said valve to open the same only when the basket is moved out of infusion position.

2. The structure set forth in claim 1, and said valve actuating mechanism including a control element positioned for engagement by said basket when the same is in infusion position to hold said valve in closed position but including means for opening said valve when the basket is moved out of infusion position.

3. The structure set forth in claim 2, and said engageable element consisting in a bell crank lever having its lower end connected with said valve and its upper end engageable by said basket in infused position to lift said valve into closed position but constructed and arranged to release said valve and open the same when the basket is removed.

4. In a coffee maker of the pressure infusion type, an infusion head assembly comprising a mounting head element defining a generally cylindrical chamber in the lower portion thereof, a projectible locking and sealing element having passage means therethrough and mounted in said cylindrical chamber for both rotational and rectilinear movement therein, projecting means on one of said elements interfitting in cooperative relationship with the other element and constructed and arranged to project said locking and sealing element in a rectilinear direction in response to rotational movement thereof, means for producing rotational movement of said element, a hot water control valve in said passage means opening in response to projection of said locking and sealing element into sealing position to permit liquid to flow through said passage means, means for supplying hot water under pressure to said passage means, a basket for confining coffee and having a liquid coffee discharge opening in the bottom thereof and removably mounted on said mounting head element and receiving within the upper portion thereof in sealed locking relation said projectible member when the same has been shifted downwardly into projected position, and a container for receiving liquid coffee discharged through said basket.

5. The structure set forth in claim 4, and said projecing means consisting in cooperating cam slots formed in one of said elements and cam pins mounted on the other element.

6. The structure set forth in claim 5, and said cam slots being formed in the cylindrical portion of said head element and said pins being connected in fixed relation to said projectible element and respectively working in said cam slots, at least one of said cam slots extending through the side wall of said head element and the pin in said last-mentioned cam slot extending therethrough, and including an operating handle connected therewith for producing the projecting rotational movement on said projectible element.

7. In a coffee maker of the pressure infusion type, an infusion head assembly comprising a fixed hollow mounting head element, a projectible locking and sealing element having passage means therethrough and mounted for rectilinear movement in said hollow mounting head element, actuating means controllably projecting said projectible element downwardly in said fixed head element, a basket for confining coffee mounted on said fixed head element and sealingly engaging the lower portion of said projectible element when the same has been projected downwardly, a valve seat mounted on one of said elements and a valve member carried by the other element, said valve member and said seat being aligned to interfit in sealed relation when said projectible element is in raised position but being withdrawn from said seat to open the same when said projectible element is projected downwardly by said projecting means, said valve and seat being so positioned to control the flow of water through said passage into said basket, means supplying hot water under pressure through said passage means, and a container for receiving the liquid coffee from said basket.

8. The structure set forth in claim 7, and said valve member being mounted in fixed relation to said projectible element and said seat being formed in said fixed head element.

9. The structure set forth in claim 8, and said fixed head element having passage means formed therethrough with said seat disposed in spaced relation above the lower end of said passage member, said valve member extending upwardly through the lower portion of said passage means with the upper portion thereof engaged in said seat when the same is disposed in closed position but being progressively withdrawn from said passage and being of a size to restrict the flow of liquid downwardly therethrough until said projectible element has been fully projected into sealed relation with respect to the upper portion of said basket.

References Cited in the file of this patent

UNITED STATES PATENTS

| 959,110 | Buck | May 24, 1910 |
| 1,003,317 | Bargallo | Sept. 12, 1911 |
| 1,468,642 | Lemoine | Sept. 25, 1923 |
| 1,665,199 | Bachelder | Apr. 10, 1928 |
| 1,709,290 | Torriani | Apr. 16, 1929 |
| 1,910,614 | Fazan et al. | Mar. 23, 1933 |
| 2,205,290 | Herrera | June 18, 1940 |
| 2,371,328 | Herrera | Mar. 13, 1945 |
| 2,839,988 | Tritt | June 24, 1958 |
| 2,887,038 | Rosander | May 19, 1959 |

FOREIGN PATENTS

| 373,387 | Germany | Apr. 11, 1923 |
| 421,622 | Italy | May 28, 1947 |
| 541,284 | Italy | Mar. 27, 1956 |